H. GREER, Jr.
DUMPING CAR.
APPLICATION FILED NOV. 14, 1910.

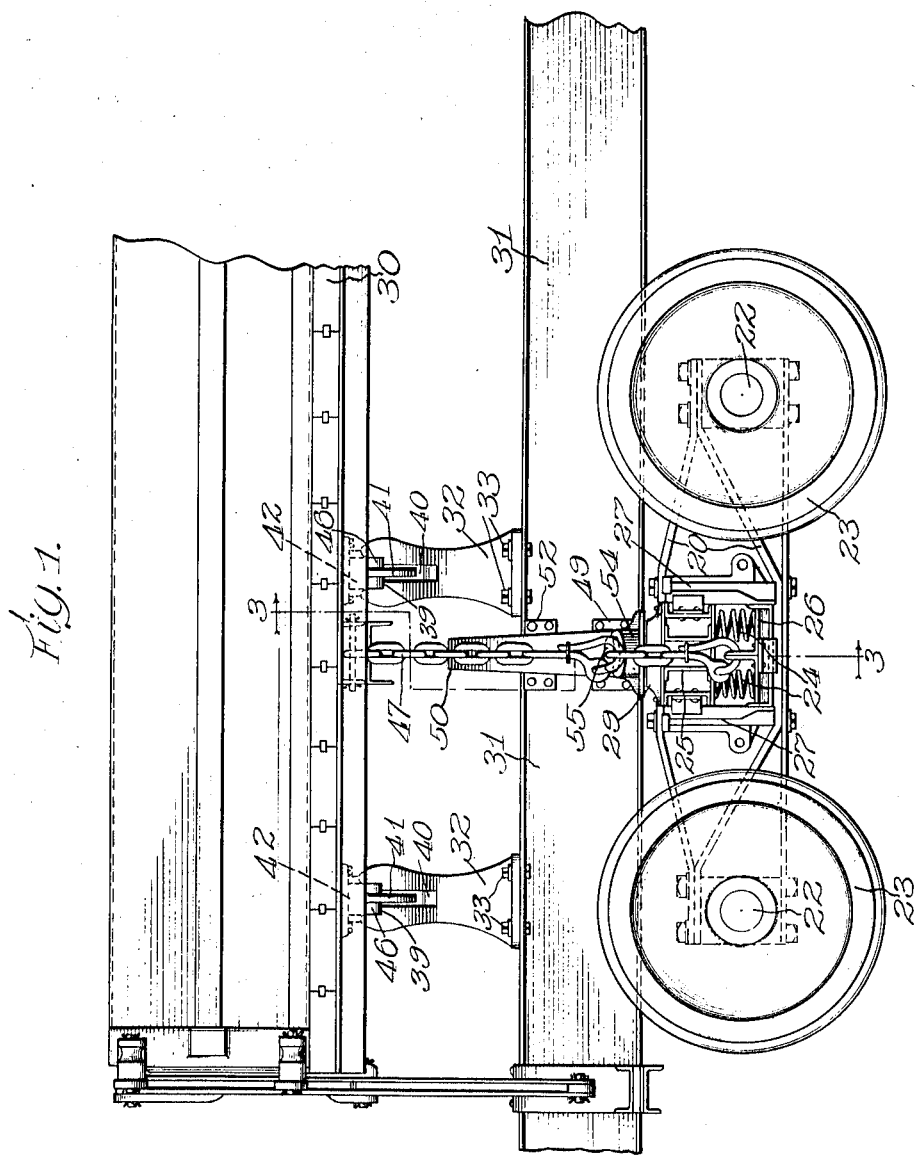

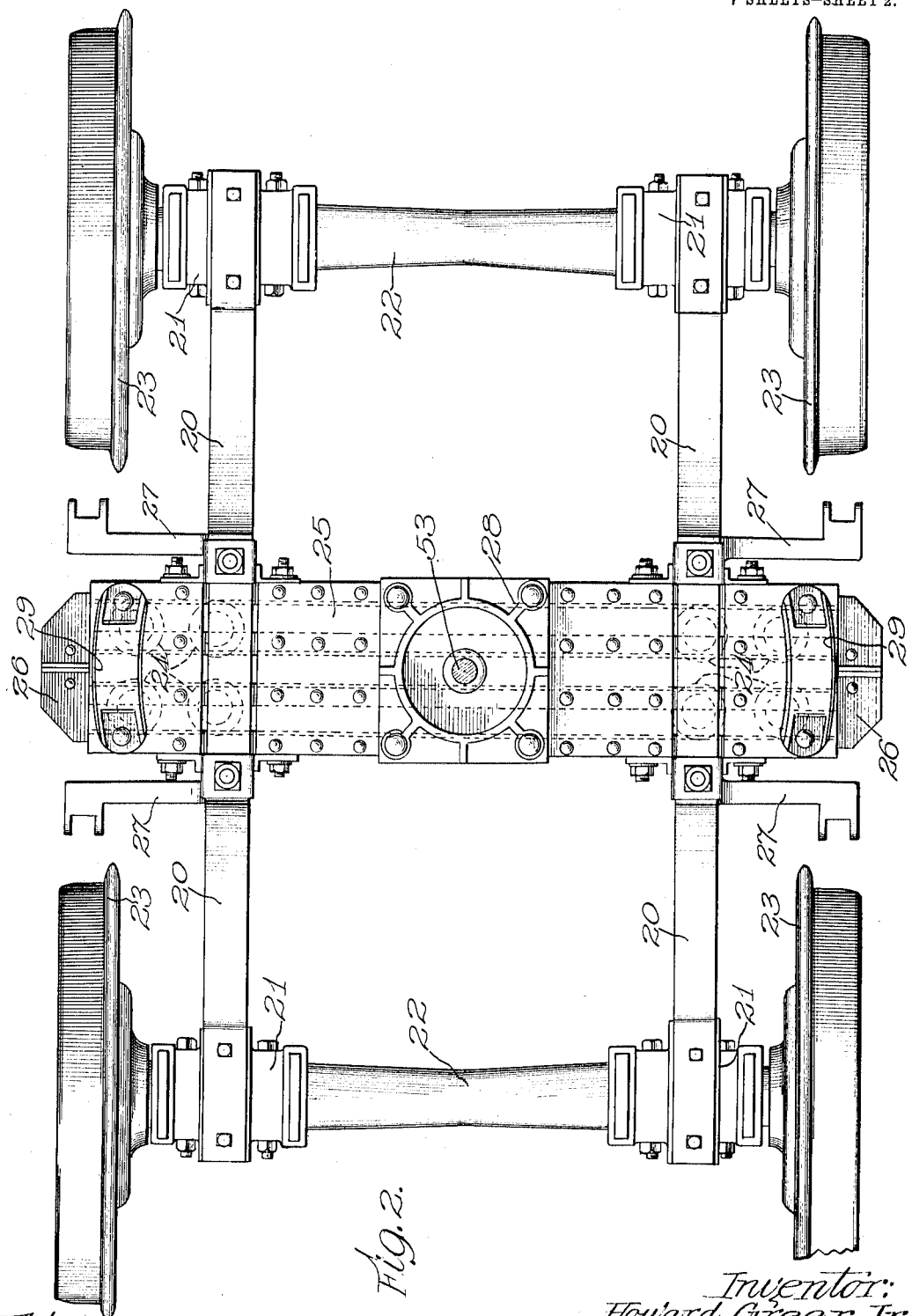

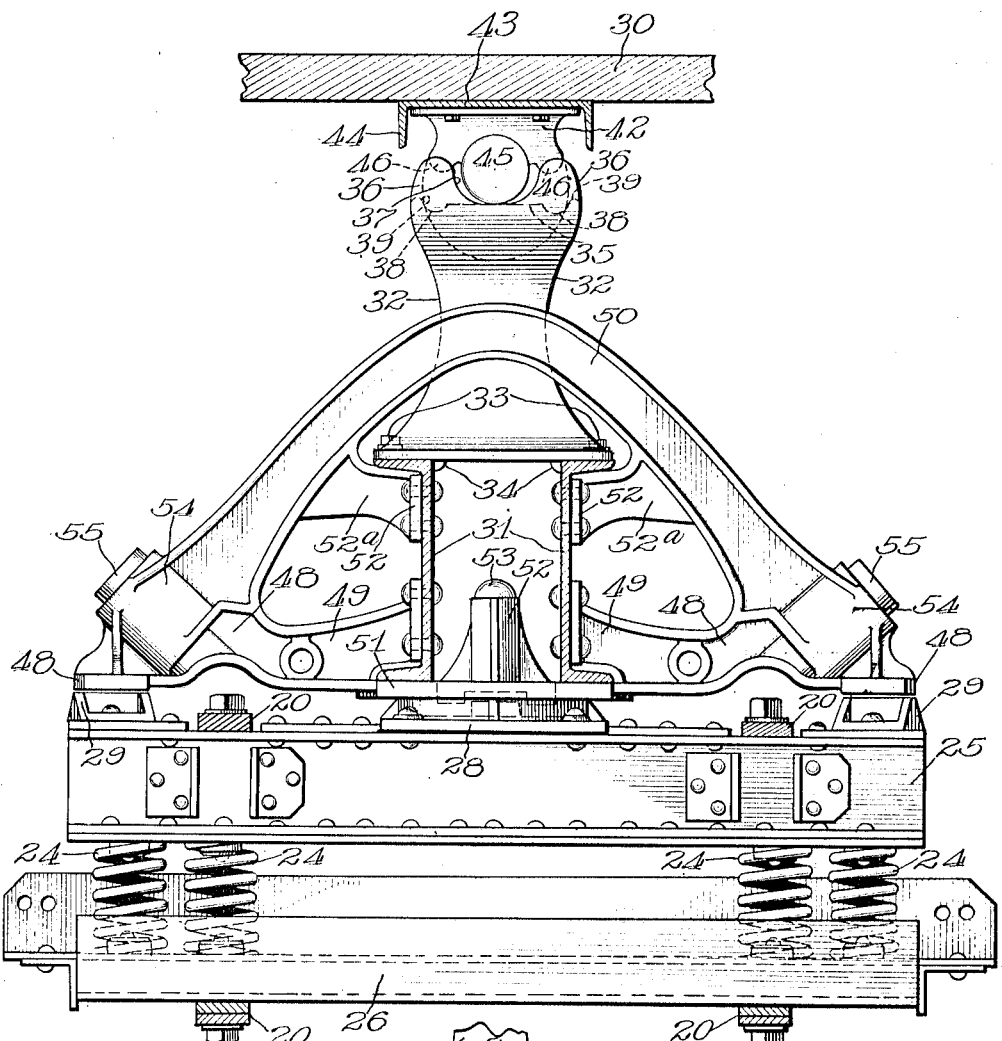
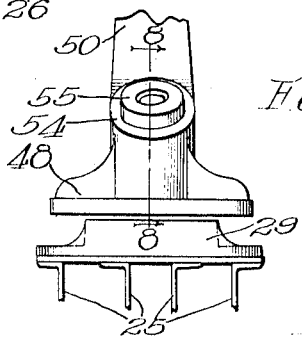

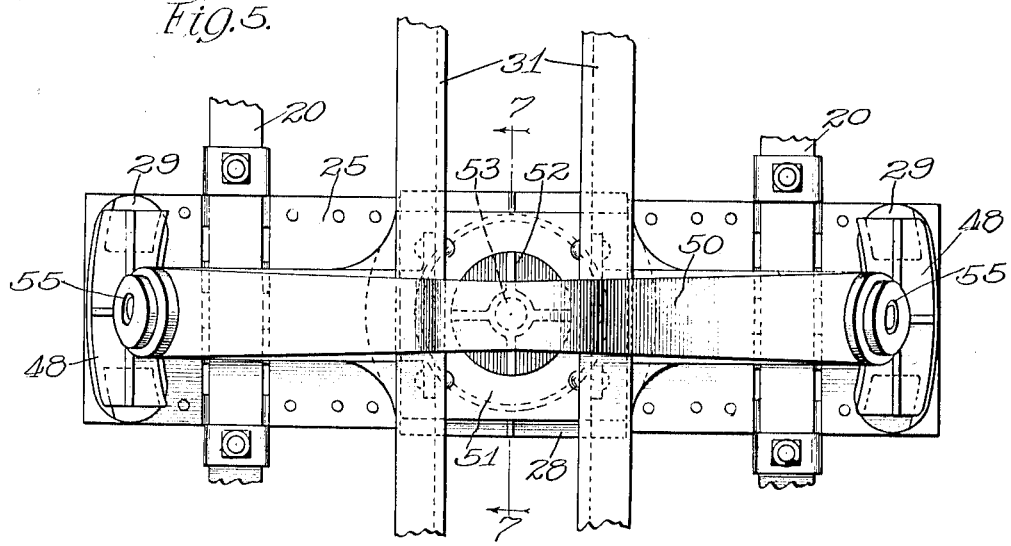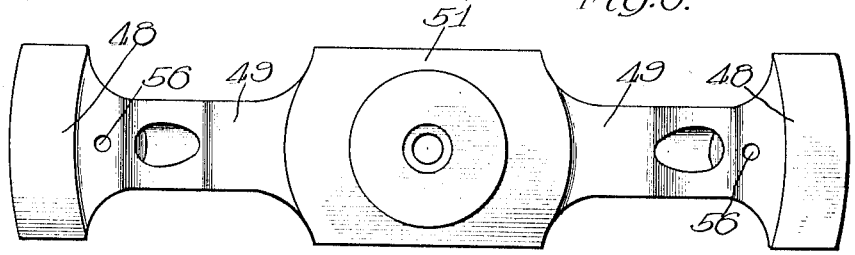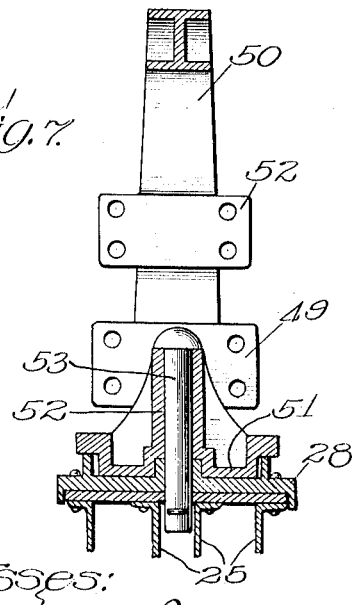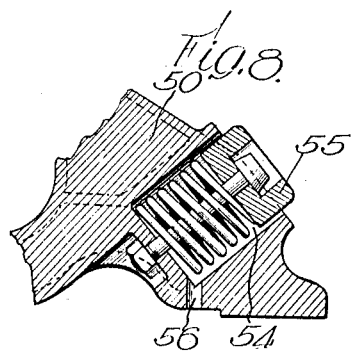

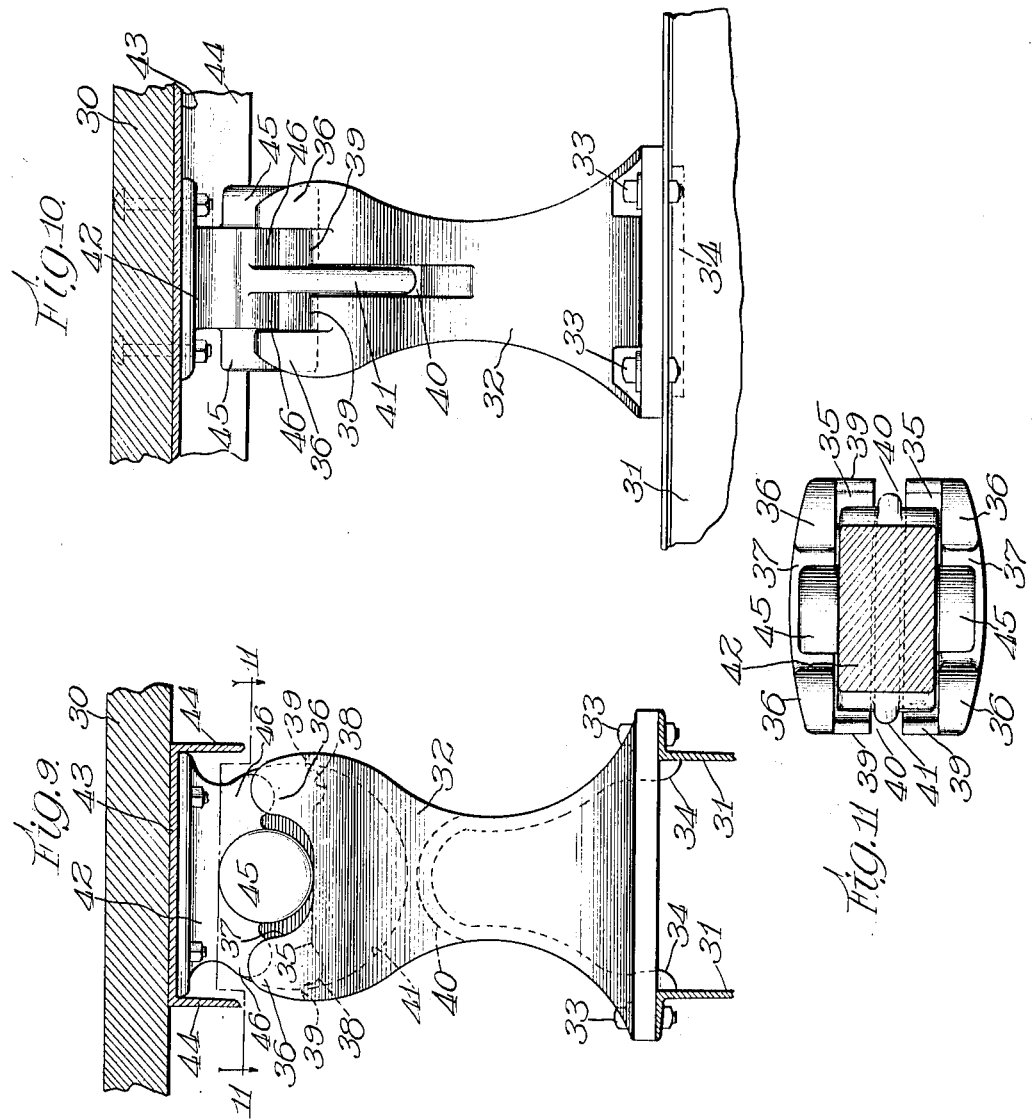

1,035,579.

Patented Aug. 13, 1912.
7 SHEETS—SHEET 6.

Witnesses:

Inventor:
Howard Greer Jr
By: Brown & Hopkins
Attys.

H. GREER, Jr.
DUMPING CAR.
APPLICATION FILED NOV. 14, 1910.

1,035,579.

Patented Aug. 13, 1912.
7 SHEETS—SHEET 7.

Witnesses:

Inventor:
Howard Greer Jr
By: Brown & Hopkins
Attys:

UNITED STATES PATENT OFFICE.

HOWARD GREER, JR., OF EVANSTON, ILLINOIS, ASSIGNOR TO CARTER H. FITZ-HUGH AND FREDERICK P. LUTHER, BOTH OF CHICAGO, ILLINOIS.

DUMPING-CAR.

1,035,579.  Specification of Letters Patent.  Patented Aug. 13, 1912.

Application filed November 14, 1910. Serial No. 592,167.

*To all whom it may concern:*

Be it known that I, HOWARD GREER, Jr., a citizen of the United States, residing at Evanston, in the county of Cook and State of Illinois, have invented certain new and useful Improvements in Dumping-Cars, of which the following is a specification.

This invention relates to improvements in dumping cars in which the wheel journal boxes are located on the inside of the wheels and in position so that they will not engage any obstructions and so that they will not be embedded in the material dumped to the side of the car, and one of the objects of the invention is to provide an improved construction of car body pedestal which will facilitate the dumping of the car and which, with the arrangement of the inside wheel journal boxes, will increase to a maximum the angle of dump of the car.

A further object is to provide an improved construction of car body bolster.

To the attainment of these ends and the accomplishment of other new and useful objects, as will appear, the invention consists in the features of novelty in the construction, combination and arrangement of the several parts hereinafter more fully described and claimed and shown in the accompanying drawings illustrating an embodiment of the invention, and in which—

Figure 12:
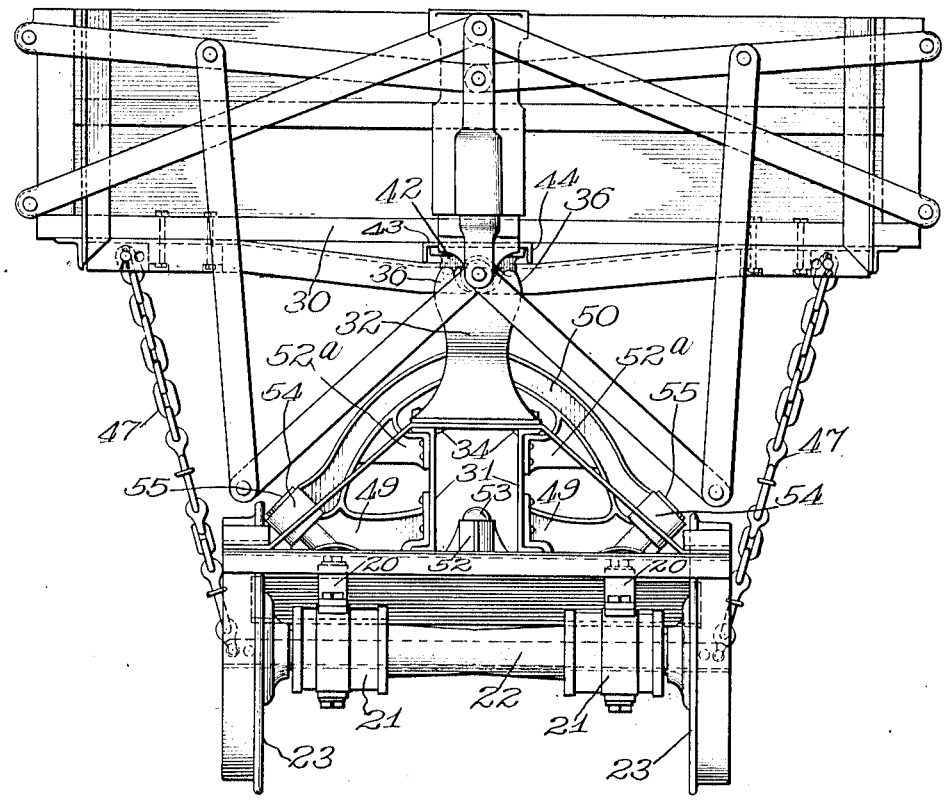
Figure 13:
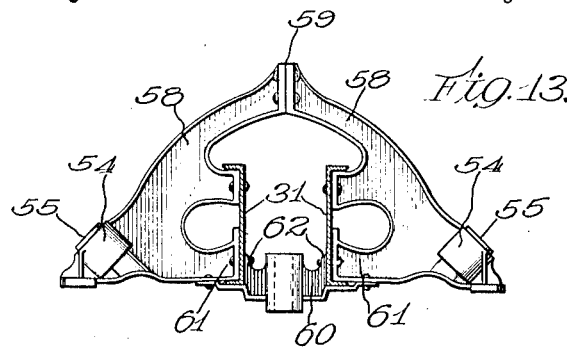
Figure 14:
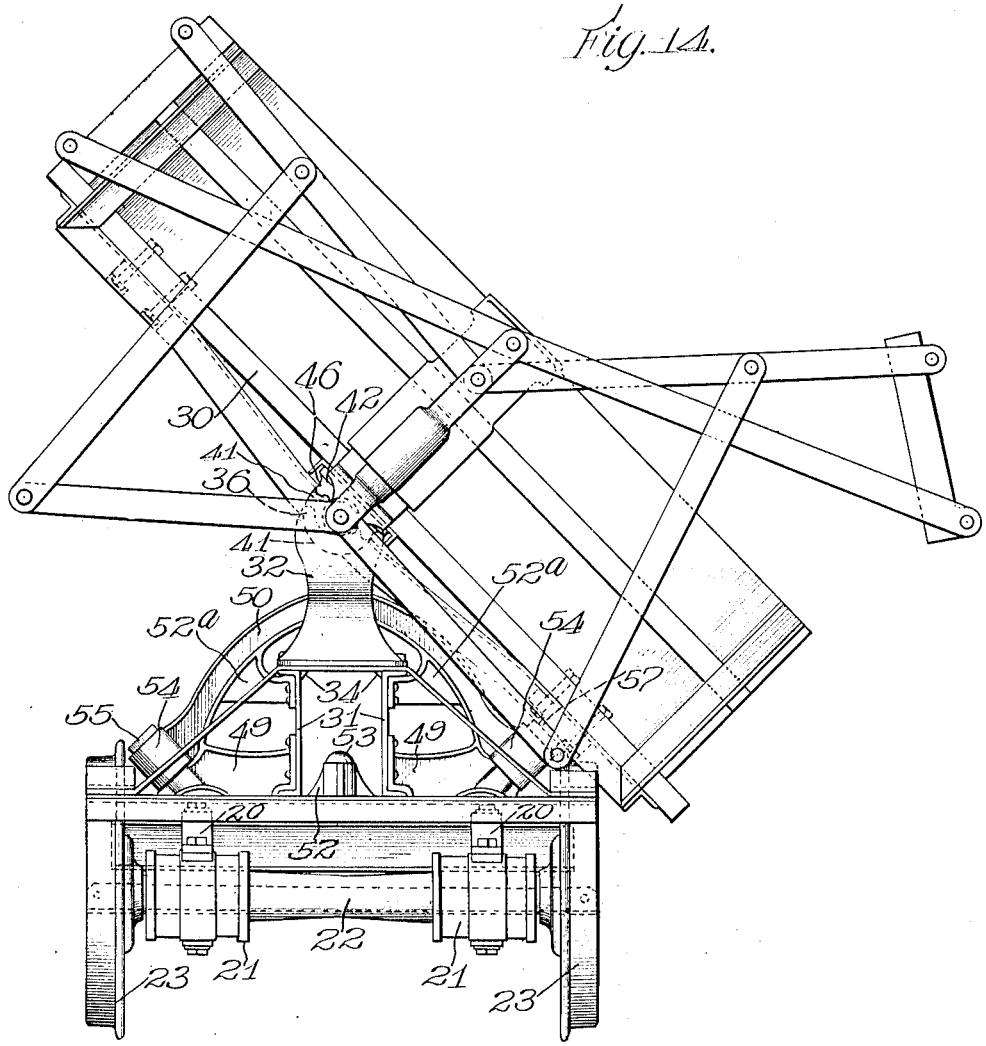
Figure 15:
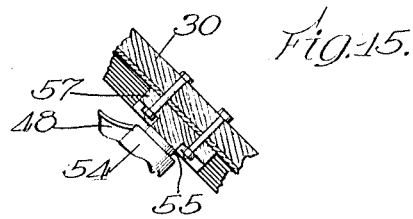

Figure 1 is a detail side elevation of a car having an improved body bolster and pedestal applied thereto constructed in accordance with the principles of this invention. Fig. 2 is a top plan view of the car truck. Fig. 3 is an enlarged detail view, partly in elevation and partly in section and with parts omitted, and as taken on line 3—3, Fig. 1. Fig. 4 is a detail elevation of one extremity of the body bolster. Fig. 5 is a top plan view of the body and truck bolsters. Fig. 6 is a bottom plan view of the body bolster. Fig. 7 is a detail sectional view on line 7—7, Fig. 5. Fig. 8 is a detail sectional view on line 8—8, Fig. 4. Fig. 9 is an enlarged side elevation of the car body pedestal, showing parts of the support and car body in section. Fig. 10 is an end elevation of Fig. 9, showing a portion of the car body in section. Fig. 11 is a detail sectional view on line 11—11, Fig. 9. Fig. 12 is a left hand end elevation of Fig. 1, showing the car body in position to receive a load. Fig. 13 is an elevation of a modified form of body bolster. Fig. 14 is a view similar to Fig. 12, showing the car body in a dumping position. Fig. 15 is a detail view partly in elevation and partly in section showing the bumper on the bolster and the bumper plate which is secured to the bottom of the car body, the latter being in section.

Referring more particularly to the drawings and in the present exemplification of the invention, the numeral 20 designates the arch bars forming the sides of the truck which support the journals 21 for the axles 22 of the wheels 23. These journals 21 are located on the inside of the wheels of the truck so that there will be no projection extending beyond the outer faces of the wheels. The springs 24 of the truck bolster 25 rest upon the spring seat 26 and the bolster rests upon the top of these springs in the ordinary and usual manner to be guided by the bars or columns 27. The truck bolster is of any desired construction but is preferably of channel iron construction having a center plate 28 secured thereto, and which center plate is provided with the usual opening for the king pin. The usual truck side bearings 29 are provided on the bolster 25 adjacent the ends thereof.

The car body 30 is supported by the sills 31 by means of pedestals, each comprising a supporting section 32 which latter rests upon the top of the sill members 31 and are secured thereto in any suitable manner, preferably by means of fastening devices 33 in the form of bolts or the like, which pass through the base of the pedestal and a flange on the sill members. Each of the pedestals may also be provided with a projecting ear or rib 34 depending below the lower face of the base thereof and inside of the sill members 31 to engage the faces thereof to assist in holding the pedestals against lateral displacement with respect to the sill members.

Supporting section 32 of the pedestal may be of any desired height and is provided at its upper end with a recessed portion 35 to form upwardly projecting spaced flanges 36 and these flanges are each provided with a centrally disposed recess 37 opening through the tops of the flanges, the bottom of the recesses 37 terminating in substantially the same plane as the plane of the bottom of the recessed portion 35. The bottom of the recess 35 between the flanges 36 is further provided with recesses 38 extending below the bottom 35 to form projections 39 which latter are located adjacent the edges of the flanges 36 and project above the bottom of the recess 35. The recesses 38 and the projections 39 are both located within the plane of the respective edges formed by the flanges 36 and the respective walls of the recess 37. The supporting section 32 of the pedestal is also provided with a recess 40 which opens through the bottom of the recess 35 and also through the upwardly projecting portions 39. This recess 40 is preferably disposed midway between the flanges 36 and is adapted to receive a web or flange 41 on an oscillating section 42 of the pedestal. This section 42 is secured to the bottom 30 of the car in any suitable manner, preferably by being secured to the angle truss bar 43 between the flanges 44 of the bar. This section 42 of the pedestal is provided with laterally projecting portions 45 which are of cylindrical construction to form trunnions. These trunnions 45 are adapted to rest upon the bottoms of the recesses 37 in the flanges 36 and are of a diameter somewhat smaller than the recesses so that the oscillating section 42 may be rocked upon the supporting section 32, the trunnions 45 rotating in the recesses 37 to permit such oscillation. These trunnions 45 are preferably centrally disposed with respect to the edges of the web 41. Shoulders 46 are provided on the section 42 which extend over and are normally spaced above the respective recesses 38 in the bottom of the recess 35 when the car body 30 is held in a substantially horizontal position, but when the car body is rocked on the trunnions 45 to oscillate the section 42, one pair of the shoulders 46 will be lowered toward the respective recesses 38 while the car body is rocking about the trunnion 45. As this rocking movement is imparted to the car body the trunnion 45 will travel toward the wall of the recess 37 on the side toward which the car is being dumped. By the time the trunnions 45 reach a position in close proximity to the walls of the recesses 37, the shoulders 46 which are being lowered will be moved in close proximity to the recesses 38. This motion will be imparted to the car body by throwing the latter out of balance and by the time the shoulders 46 enter the recesses 38, the inertia of the car body will complete the dumping, and the shoulders or projections 39 will hold the parts against displacement. After the car has been dumped, the car body 30 may be swung about the trunnions 45 in the opposite direction until it assumes a position to be again loaded. Cars of this general type are generally loaded with the weight on one side, that is, on the side to which the car is to be dumped, and is held against accidental dumping by means of the anchor chains 47, which latter are secured by one of their extremities to the car body and by their other extremities to the truck. The web 41 is provided for maintaining the oscillating section 42 against lateral displacement with respect to the supporting section 32 when the car body is in motion or when a sudden movement is imparted to the car trucks. Any number of these pedestals may be employed according to the size and capacity of the car and are of such height that when the car is dumped and assumes the position shown in Fig. 14 a maximum angle of dump will be obtained and by the provision of the inside truck journals, this angle of dump will be substantially forty-nine degrees, or several degrees greater than the maximum angle of dump heretofore obtained in cars of this character. It will also be apparent that by the arrangement of the journals inside of the wheels, the journal boxes will not be embedded or buried in the material dumped from the car, which latter would form obstructions to the advancement of the car and through which the journal boxes would have to be moved before the car could be advanced, or the material dumped would have to be removed from around the journal boxes in order to clear the latter.

The body bolster is preferably constructed with a base designated generally by the reference numeral 48 having arms or portions 49 which terminate short of each other, as shown more clearly in Fig. 3, and a top member 50 which is arched as shown so that the body bolster will be of a substantially triangular formation. The sills 31 of the car project into the space between adjacent extremities of the arms 49 of the bolster and the upper member 50 arches over the sill members and the arch member is of a height to extend for some distance above the base of the pedestal. The extremities of the arms 49 are secured to the sills 31 in any suitable manner, preferably by fastening devices 51$^a$ passing through the sill members and flanged portions of the arms and a center plate 51 having a king pin guide 52 is secured to the arms to extend across the sills and below the latter. The guide 52 in the center of the plate 50 registers with the opening in the center plate 28 of the truck bolster 25 and the king pin 53 is passed through the guide 52 and the opening in the plate 28, as shown more clearly in Fig. 7. If desired, additional arms 52 may be provided which extend from the inner face of the arched member 50 and engage the sill members 31 and these arms 52 may be secured to the sill members by fastening devices similar to the fastening devices 51ª. With this improved construction of body bolster, it will be apparent that the maximum strength will be obtained from a given amount of material and by extending the arched member for some distance above the base of the pedestals and over the sill members, it will be apparent that all tendency of the parts to twist and thereby wrench the parts will be overcome.

The body bolsters are provided with sockets 54 for the reception of cushions or bumpers 55 and the sockets 54 are provided with apertures 56 opening through the bottom thereof and through which apertures any water which may have found its way into the recesses will be discharged. The side bearings 29 on the truck bolster 25 for the body bolster 50 are also located within the planes of the outer faces of the wheels 23 of the truck. With the bearings 29 thus arranged, and the journals 21 arranged on the inside of the wheels when the body bolster is brought into engagement with one or the other of the bearings 29, the stress thus exerted on one end of the truck bolster 25 will tend to force the opposite side of the truck downwardly and thereby maintain the wheels of the truck on the opposite side of the car in engagement with the track. Bumper plates 57 may be provided, if desired, and when provided may be secured to the bottom of the car body 30 so that they will engage the bumpers 55 when the car is dumped.

The body bolster is shown in Fig. 13 as being of a sectional construction and comprising sections 58 which are united as at 59 preferably at the top of the arch formed by the upper member of the bolster. The center plate 60 is arranged between the extremities of the arms 61 and also between the sills 31 and fastening devices 62 are provided which pass through flanged portions of the center plate 60, the web of the sills 31 and flanged portions of the arms 61. With this construction it will be apparent that the sections are duplicates of each other and may be readily assembled and secured together, thereby materially reducing the cost of production of the bolster. With a body bolster of this construction which is arched over the sill members and which is secured in position to the sill members through the medium of the arms or projecting portions 49, 52ª, the latter may be sprung into position in the event that they do not normally assume proper and correct positions with respect to the sill members to which they are to be secured.

What is claimed as new is—

1. A body bolster for dumping cars and the like of substantially triangular configuration and through which the car sill projects, the apex of the triangle being adapted to extend for some distance above the sill, and outwardly opening bumper sockets in the bolster adjacent the base thereof.

2. A body bolster for dumping cars and the like of substantially triangular configuration and through which the car sill projects, the apex of the triangle being adapted to extend for some distance above the sill, and outwardly opening bumper sockets in the bolster adjacent the base thereof, each of said sockets being provided with a drain opening through the wall thereof.

3. A body bolster for dumping cars and the like comprising an apertured body of substantially triangular shape, and having oppositely disposed extensions projecting from the inner face thereof toward and terminating short of each other and between the adjacent extremities of which extensions the car sill is adapted to project.

4. A body bolster for dumping cars and the like comprising an apertured body of substantially triangular shape, and having oppositely disposed extensions projecting from the inner face thereof toward and terminating short of each other and between the adjacent extremities of which extensions the car sill is adapted to project, and outwardly opening bumper sockets arranged adjacent the base of the bolster.

5. A body bolster for dumping cars and the like comprising an apertured body of substantially triangular configuration and constructed of complementary sections, and means securing the sections together.

6. A body bolster for dumping cars and the like comprising an apertured body of substantially triangular configuration and constructed of complementary sections, and means securing the sections together, said sections being provided with extensions projecting from the inner faces thereof, the projections on the sections being disposed opposite to each other and terminate short of each other to receive the car sill between their adjacent extremities.

7. A body bolster for dumping cars and the like comprising an apertured body of substantially triangular configuration and constructed of complementary sections, and means securing the sections together, said sections being provided with extensions projecting from the inner faces thereof, the projections on the sections being disposed opposite to each other and terminate short of each other to receive the car sill between their adjacent extremities, each section being also provided with an outwardly opening bumper socket adjacent the base thereof.

8. The combination of a car sill, an apertured body bolster substantially triangular in configuration, the apex of the bolster arching over and spaced above the sill, and cushioning devices carried by the bolster adjacent the body thereof.

9. The combination of a car sill, an apertured body bolster substantially triangular in configuration, the apex of the bolster arching over and spaced above the sill, and cushioning devices carried by the bolster adjacent the angles formed by the sides and base of the bolster.

In testimony whereof I have signed my name to this specification, in the presence of two subscribing witnesses, on this 10th day of November A. D. 1910.

HOWARD GREER, JR.

Witnesses:
FREDERICK P. LUTHER,
J. H. JOCHUM, Jr.